United States Patent Office 3,355,492
Patented Nov. 28, 1967

3,355,492
DICHLOROBIS(DIFLUORAMINO)METHANE
Robert L. Rebertus, Mendota Heights, and John G. Gagnon, St. Paul, Minn., assignors to Minnesota Mining and Manufacturing Company, St. Paul, Minn., a corporation of Delaware
No Drawing. Filed Oct. 5, 1964, Ser. No. 404,201
1 Claim. (Cl. 260—583)

This invention relates to a new and useful composition of matter.

Dichlorobis(difluoramino)methane, the compound of the invention, is a useful intermediate for the production of difluorodiazirine by reaction thereof with potassium iodide in moist acetonitrile. By employing a few percent (i.e., about 1 to 10 percent) of boric acid in the acetonitrile, chlorofluorodiazirine is also obtained as a by product. By reaction wth metallic silver or $AgNO_2$ dichloro-N-fluoromethylenimine is obtained.

It is an object of this invention to produce dichlorobis-(difluoramino)methane.

A 300 ml. glass vessel is charged with 12 g. of a mixture of 3 volumes of concentrated hydrochloric acid with 1 volume of concentrated nitric acid, i.e., aqua regia, cooled to about $-111°$ C., and connected to a transfer system. The system is evacuated and 0.2 g. of perfluoroguanidine is transferred to the vessel by condensation. After warming to room temperature, the perfluoroguanidine is substantially entirely present in the vapor phase under reduced pressure in the vessel. Reaction takes place over about 2 days or longer to form dichlorobis(difluoramino)methane which is recovered by fractionation of the condensate from the vapor phase after treatment with 50% aqueous sodium hydroxide to remove acidic materials and unreacted perfluoroguanidine.

Dichlorobis(difluoramino)methane is characterized by the presence in infrared absorption spectra of bands in the regions of N—F and C—Cl bands (at 9.49, 9.64, 10.27, 10.94 and 11.34 microns) and absence of bands in the C—F region. It is further characterized by a broad nuclear magnetic resonance absorption (in $CFCl_3$ solvent as described by Filipovich and Tiers, Journal of Physical Chemistry, volume 63, page 761 et seq., 1959) at $-42.3\phi$ ascribed to difluoramino groups. Mass spectral data show fragmentation to $-ClC(NF_2)_2$, $Cl_2C(NF_2)-$ and numerous smaller fragments. Fragments contain variously $Cl^{35}$ and $Cl^{37}$ singly or in combination.

What is claimed is:
The compound dichlorobis(difluoramino)methane.

References Cited

Hoffman et al.: Chem. Reviews, vol. 62, p. 15, (1962) QD 1 A563.

CHARLES B. PARKER, *Primary Examiner.*

C. D. QUARFORTH, *Examiner.*

L. A. SEBASTIAN, *Assistant Examiner.*